United States Patent
Xie et al.

(10) Patent No.: US 6,813,414 B1
(45) Date of Patent: Nov. 2, 2004

(54) FIBER OPTICAL PIGTAIL GEOMETRY FOR IMPROVED EXTINCTION RATIO OF POLARIZATION MAINTAINING FIBERS

(75) Inventors: Ping Xie, San Jose, CA (US); Yonglin Huang, San Jose, CA (US); Salvador P. Tiscareno, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 92 days.

(21) Appl. No.: 09/617,736

(22) Filed: Jul. 17, 2000

(51) Int. Cl.[7] ............................. G02B 6/00; G02B 6/26
(52) U.S. Cl. ............................. 385/31; 385/11; 385/50
(58) Field of Search ............................. 385/11, 31, 50, 385/51, 104, 106, 107, 108, 123, 124, 126, 127, 128

(56) References Cited

U.S. PATENT DOCUMENTS

| | | | | |
|---|---|---|---|---|
| 5,064,267 A | * | 11/1991 | Rossberg | 385/50 |
| 5,293,440 A | * | 3/1994 | Miles et al. | 385/51 |
| 5,420,949 A | * | 5/1995 | Arima et al. | 385/43 |
| 5,689,578 A | * | 11/1997 | Yamauchi et al. | 385/123 |
| 5,881,185 A | * | 3/1999 | Feth et al. | 385/11 |
| 5,949,941 A | * | 9/1999 | DiGiovanni | 385/127 |
| 6,160,933 A | | 12/2000 | Laude | 385/31 |
| 6,331,913 B1 | * | 12/2001 | Huang et al. | 359/497 |
| 6,529,325 B1 | * | 3/2003 | Kokkelink et al. | 359/497 |
| 6,628,461 B2 | * | 9/2003 | Huang et al. | 359/494 |
| 2002/0110307 A1 | * | 8/2002 | Huang et al. | 385/11 |
| 2003/0063832 A1 | * | 4/2003 | Hellman et al. | 385/11 |

FOREIGN PATENT DOCUMENTS

| | | | |
|---|---|---|---|
| EP | 0 725 289 A | 8/1996 | |
| JP | 0725289 A2 * | 8/1996 | G02B/6/38 |
| JP | 11-258453 | 9/1999 | G02B/6/28 |
| JP | 2000-066053 | 3/2000 | |
| JP | 2000-066054 | 3/2000 | |

* cited by examiner

*Primary Examiner*—Akm Enayet Ullah
*Assistant Examiner*—Kevin S. Wood
(74) *Attorney, Agent, or Firm*—Workman Nydegger

(57) ABSTRACT

A method for improving the extinction ratio of a grouping of polarization maintaining (PM) fibers is disclosed, comprising: providing a plurality of PM fibers, the PM fibers each having corresponding principal axes; disposing the plurality of PM fibers as a grouping, the grouping having corresponding secondary axes; and aligning the plurality of PM fibers such that the corresponding principal axes of the plurality of the PM fiber and the secondary axes of the grouping intersect at a predetermined angle. Through the methods of the present invention, the extinction ratio of PM fibers may be improved.

9 Claims, 5 Drawing Sheets

Prior Art Optical Fiber

Prior Art PM Fiber

Present Invention

FIBER OPTICAL PIGTAIL GEOMETRY FOR IMPROVED EXTINCTION RATIO OF POLARIZATION MAINTAINING FIBERS

BACKGROUND OF THE INVENTION

1. Field of the Invention

The present invention relates generally to fiber optics. In particular, the present invention relates to the grouping of polarization maintaining fibers.

2. The Prior Art

BACKGROUND

In the field of fiber optics, one of the most valuable properties of light is the phenomenon of polarization. Light is described as a transverse wave when travelling through a medium such as glass, air or vacuum, whereby by the electric and magnetic fields which comprise the light oscillate in a plane perpendicular to the direction in which the light is travelling. Many factors may influence the polarization of light, including reflections from surfaces, external magnetic fields, and in particular, stresses in the transmitting media.

FIG. 1 shows a cut-away view of a prior art optical fiber 100. Optical fiber 100 includes a core 102 within cladding 104. The indexes of refraction of the core 102 and the cladding 104 are configured using methods standard in the art to allow light launched in to the fiber to be transported through the optical fiber 100. The core 102 and the cling 104 is typically encapsulated in a jacket 106, which may be fabricated from material standard in the art such as a polymer. As is known by those of ordinary skill in the art, the index of refraction of a typical optical fiber is isotropic, and thus when light is launched in to a fiber the light will tend to travel with an arbitrary polarization direction.

However, in some applications, it is desirable to have the light propagate through the fiber with a predetermined polarization. Therefore, the isotropic indexes of refraction of fibers, coupled with the fact that internal stresses in the optical fiber can influence the polarization, causes problems with fibers when used in the field. For example, during installation and use, the optical fiber may be bent and twisted, or exposed to temperature-induced stresses. Any bending of the optical fiber may change the polarization of the light travelling therein, thus influencing the final output. Furthermore, temperature-induced changes may influence the output of the fiber over time. Any such changes in the output of an optical fiber is naturally undesirable.

The prior art has solved this problem by developing polarization maintaining (PM) fibers. A PM fiber is a fiber in which the polarization planes of lightwaves launched into the fiber are maintained during propagation with little or no cross-coupling of optical power between the polarization modes. PM fibers operate by introducing a birefringence within the fiber core. Birefringence refers to the difference between propagation constant of light travelling through the fiber for two different polarizations. When birefringence is introduced into a fiber, the circular symmetry in the fiber is broken, creating two principal axes, known as the slow and fast axes of the fiber. The two axes are created in the fiber either by changing the shape of the core or by applying asymmetric stress to the core. Most PM fibers employ the stress method and are referred to as stress induced birefringence fibers. Stress applying elements in the cladding create a stress field in the core. The plane in-line with the stress field is referred to as the slow axis. The perpendicular plane is called the fast axis. The names slow and fast refer to the relative propagation velocity in each axis. The advantage of a PM fiber is that if light is launched into the fiber linearly polarized and oriented along one of these axes, then the light output from the fiber will linearly polarized and aligned with the axis, even if the fiber is subjected to some external stresses.

FIG. 2 shows a cross-sectional diagram of one type of a prior art PM fiber 200. PM fiber 200 includes a core 202, and a pair of stress applying parts (SAP) 204 disposed proximate to core 202 within cladding 210. As will be appreciated by the of ordinary skill in the art, the configuration of FIG. 2 forms a circular SAP type, or PANDA, fiber. PANDA fibers are favored in the art since the size of a PANDA fiber is comparable to a single mode fiber. Other PM fibers that are relevant to the current invention includes TIGER fiber and BOWTIE fiber, Oval-Inner clad, oval core etc. The SAP 204 are introduced to induce a constant stress within the fiber. This constant stress creates the two principal axes, shown in FIG. 2 as the fast axis 206 and the slow axis 208.

Once a PM fiber has been constructed, the quality of the polarized light transmitted through the fiber may be expressed through a factor known as the extinction ratio (ER). ER is given in dB as:

$$ER = 10 \log(P\mathrm{max}/P\mathrm{min})$$

where Pmax and Pmin are the maximum and minimum signal intensities through a linear polarization analyzer as the analyzer rotates 360°. The polarization direction of maximum signal is usually perpendicular to that of the minimum signal. A one meter long patchcord constructed with a PM fiber can typically maintain an ER of 30 dB at 1,500 nanometers.

One application where a PM fiber has difficulty maintaining a proper ER is where several PM fibers must be bundled together. When PM fibers are bundled together, adjacent PM fibers may introduce unintended stresses into each other, the compounded stress field is usually not in alignment with the stress field in each PM fiber. The compounded stress field creates effective slow and fast axes for each individual fiber. In another words, the effective slow and fast axes do not overlap with the intrinsic slow and fast axes of each individual fiber. If a linearly polarized light is launched in to the fiber with its polarization direction aligned with the intrinsic slow or fast axis of the fiber, a lower ER in the output results.

Hence, there is a need for a method and apparatus which allows PM fibers to be disposed together while maintaining a desirable extinction ratio.

BRIEF DESCRIPTION OF THE INVENTION

The invention satisfies the above needs. The present invention relates generally to fiber optics. In particular, the present invention relates to the grouping of polarization maintaining fibers.

A method for maintaining the extinction ratio of a grouping of polarization maintaining (PM) fibers is disclosed, comprising: providing a plurality of PM fibers, the PM fibers each having corresponding principal axes; disposing the plurality of PM fibers as a grouping, the grouping having corresponding secondary axes; and aligning each of the plurality of PM fibers such that the corresponding principal axes of the plurality of the PM fiber and the secondary axes of the grouping intersect at a predetermined angle.

An apparatus according to the present invention is disclosed whereby a plurality of PM fibers each having corresponding principal axes is arranged as a group, and the grouping has its own corresponding secondary axes. The PM fibers are then aligned such that the corresponding principal axes of each PM fiber and the secondary axes of the grouping intersect at a predetermined angle.

Various aspects of the present invention include aligning each of the PM fibers such that the angles are 0° or 90°.

BRIEF DESCRIPTION OF THE DRAWING FIGURES

DETAILED DESCRIPTION OF PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Similar designations used herein are intended to designate substantially similar matter.

Figure 1:
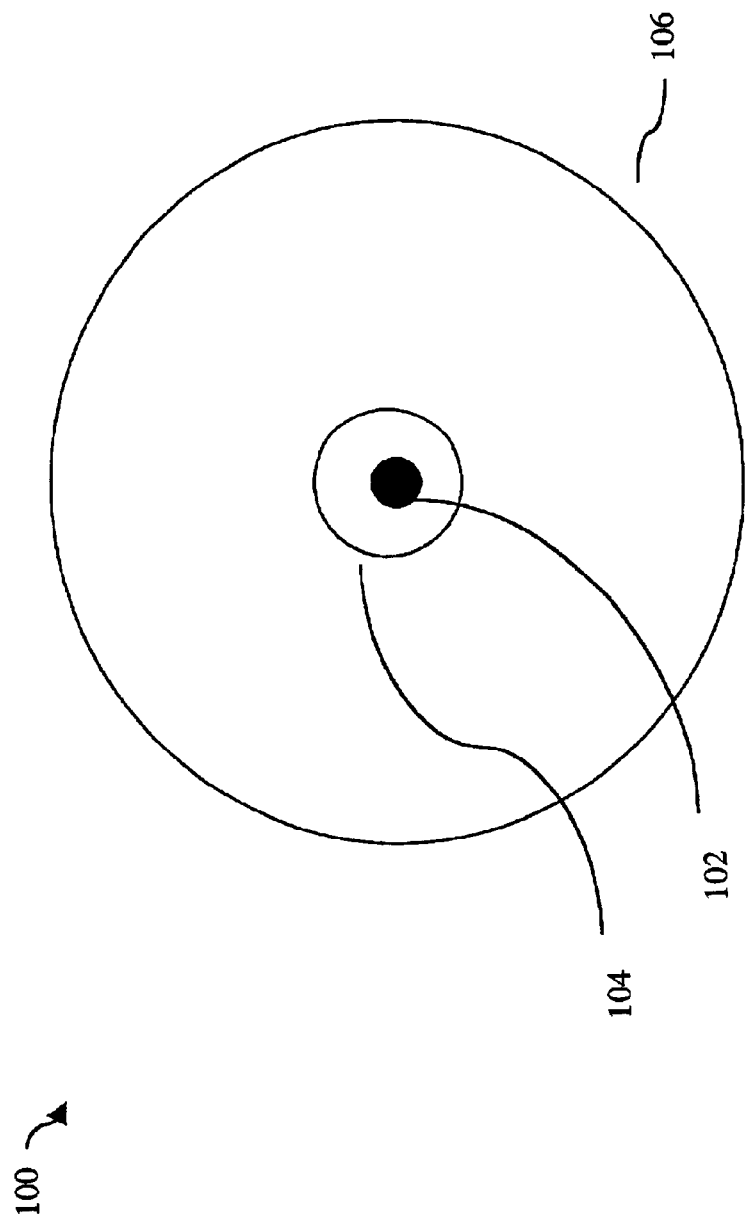
FIG. 1 is a diagram of a prior art optical fiber.
Figure 2:
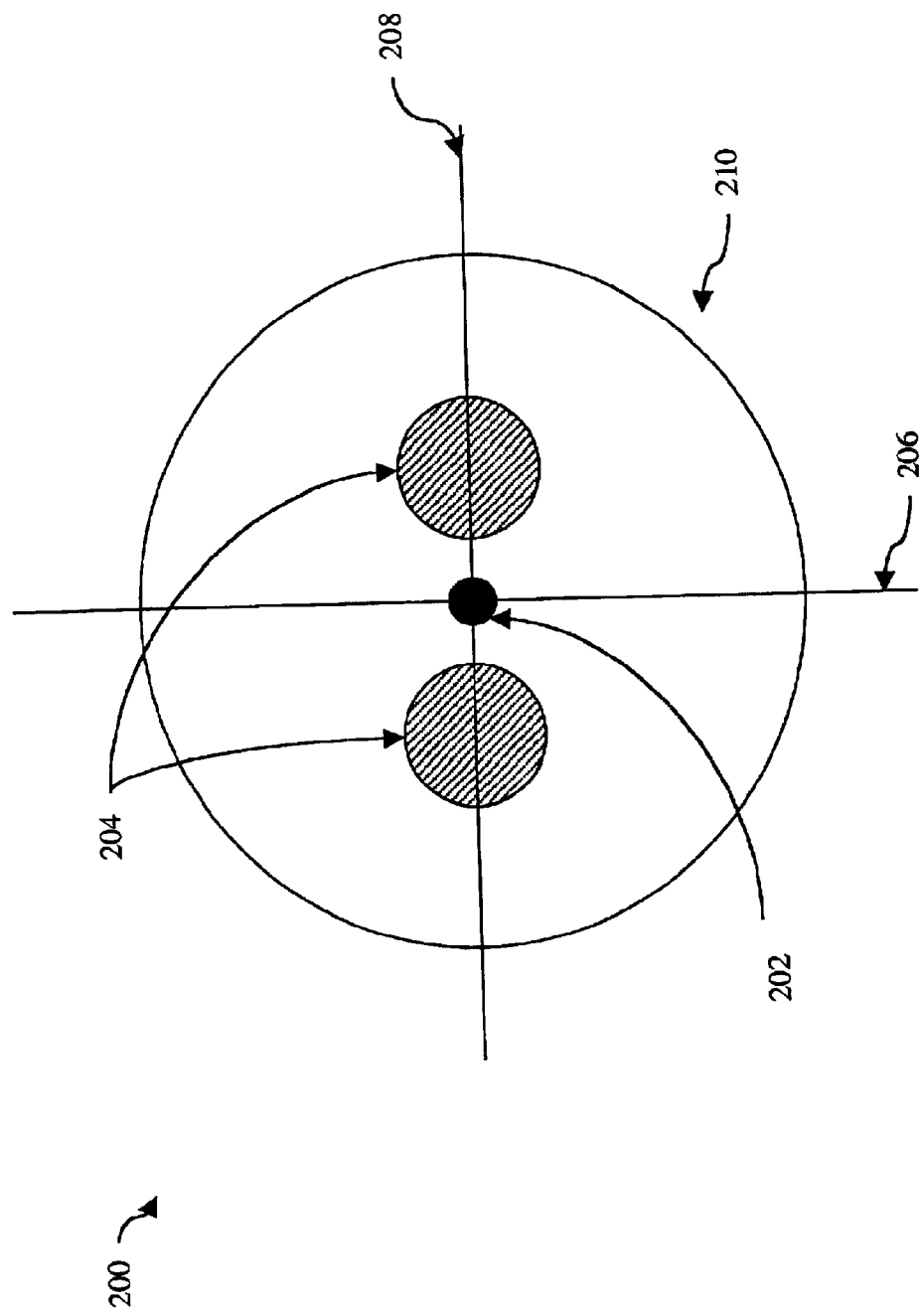
FIG. 2 is a cross-sectional diagram of a prior art polarization maintaining fiber.
Figure 3:
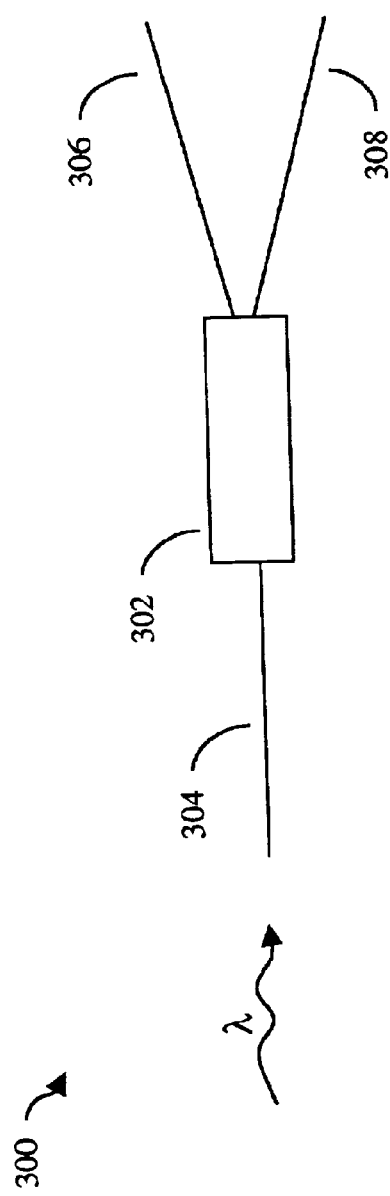
FIG. 3 is a diagram of a polarization beam splitter/combiner suitable for use with the present invention.

One application where two PM fibers may be deployed adjacent to one another is in the pigtail section of a polarization beam combiner (PBC) or polarization beam splitter (PBS). FIG. 3 shows a PBC/PBS device 300 suitable for use with the present invention. A detailed description of a PBC suitable for use with the present invention is described in U.S. patent application Ser. No. 09/365,680 which is assigned to the assignor of the present invention and incorporated herein by reference.

For background purposes, the device 300 of FIG. 3 includes a body 302. Device 300 also includes a single mode fiber 304 optically coupled to body 302, and a pair of PM fibers 306 and 308 which together form a pigtail pair. Body 302 is optically configured with lenses to function as both a polarization beam combiner or a 315 polarization beam splitter. When functioning as a PBS, device 300 will accept a lightwave λ launched into single mode fiber or PM fiber 304 and has a random polarization or predetermined polarization direction. The optics of body 302 will then split the lightwave into two components having a predetermined polarization and will properly launch the components into the pigtail pair formed by PM fibers 306 and 308. The process of the PBC is exactly the opposite with the pigtail pair of PM fibers 306 and 308 accepting the input, and single mode fiber or PM fiber 304 providing the output. Though the process described herein has used a lightwave as the information being transmitted, it is to be understood that other information or energy may be transported through device 300, such as laser energy.

Figure 4:
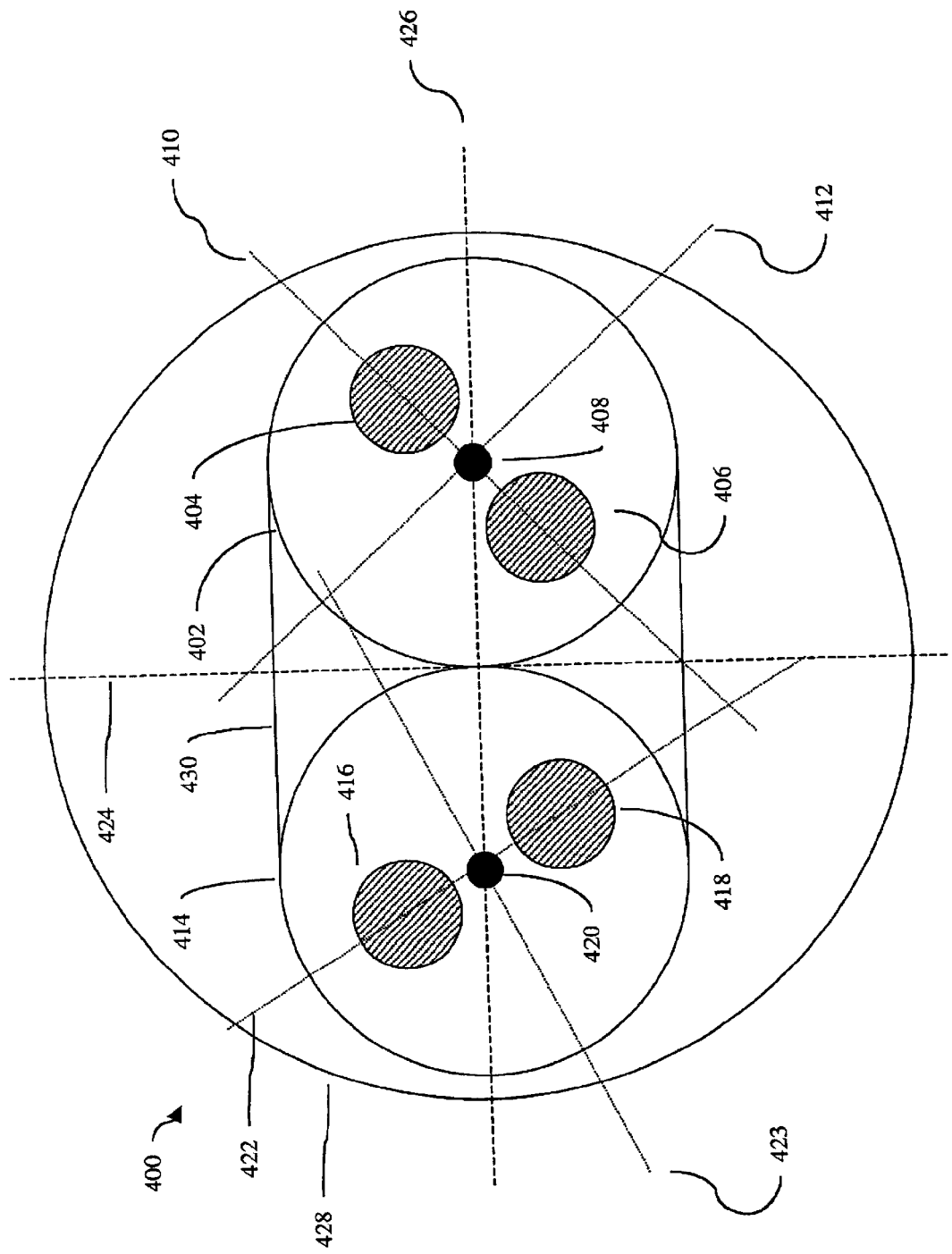
FIG. 4 is a cross-sectional diagram of a PM fiber suitable for use with the present invention.

Of relevance to the present application is how the pigtail pair of PM fibers 306 and 308 may be configured for use in the field. FIG. 4 is a cross-sectional diagram of one orientation of PM fibers in a pigtail pair. FIG. 4 shows a pigtail pair 400 which includes a first PM fiber 402 and a second PM fiber 414. First PM fiber 402 includes stress applying parts 404 and 406, and a core 408, all disposed within first PM fiber 402 as known in the art. First PM fiber 402 has a corresponding fast axis 412, and a corresponding slow axis 410.

FIG. 4 also includes a second fiber 414. Second PM fiber 414 includes stress applying parts 416 and 418, and a core 420, all disposed within second PM fiber 414 as known in the art. Second PM fiber 414 also has a corresponding fast axis 423, and a corresponding slow axis 422.

Typically, first and second PM fibers 402 and 414 are laid adjacent to each other and affixed to each other with an adhesive standard in the art such as epoxy. The PM fibers are then disposed within a ferrule 428. A typical ferrule 428 usually has an rectangular opening 430 to accommodate both the first and second PM fibers 402 and 414.

Of particular relevance to the present invention is the effect of affixing PM fibers to each other has on the ER factor of the PM fibers. The inventors of the present application have discovered that when first and second PM fibers are affixed to each other, the stress of the process forms a secondary fast axis 424 and a secondary slow axis 426 within the pigtail pair 400. These secondary axes optically affect both first and second PM fibers 402 and 414. Additionally, as can be seen by inspection of FIG. 4, if first and second PM fibers 402 and 414 are disposed in an arbitrary manner, then the secondary fast and slow axes 424 and 426 may intersect the corresponding fast and slow axes of the first and second PM fibers 402 and 414 at an arbitrary angle. The inventors have determined that having axes intersect at arbitrary angles lowers the ER of the pigtail pair.

Figure 5:
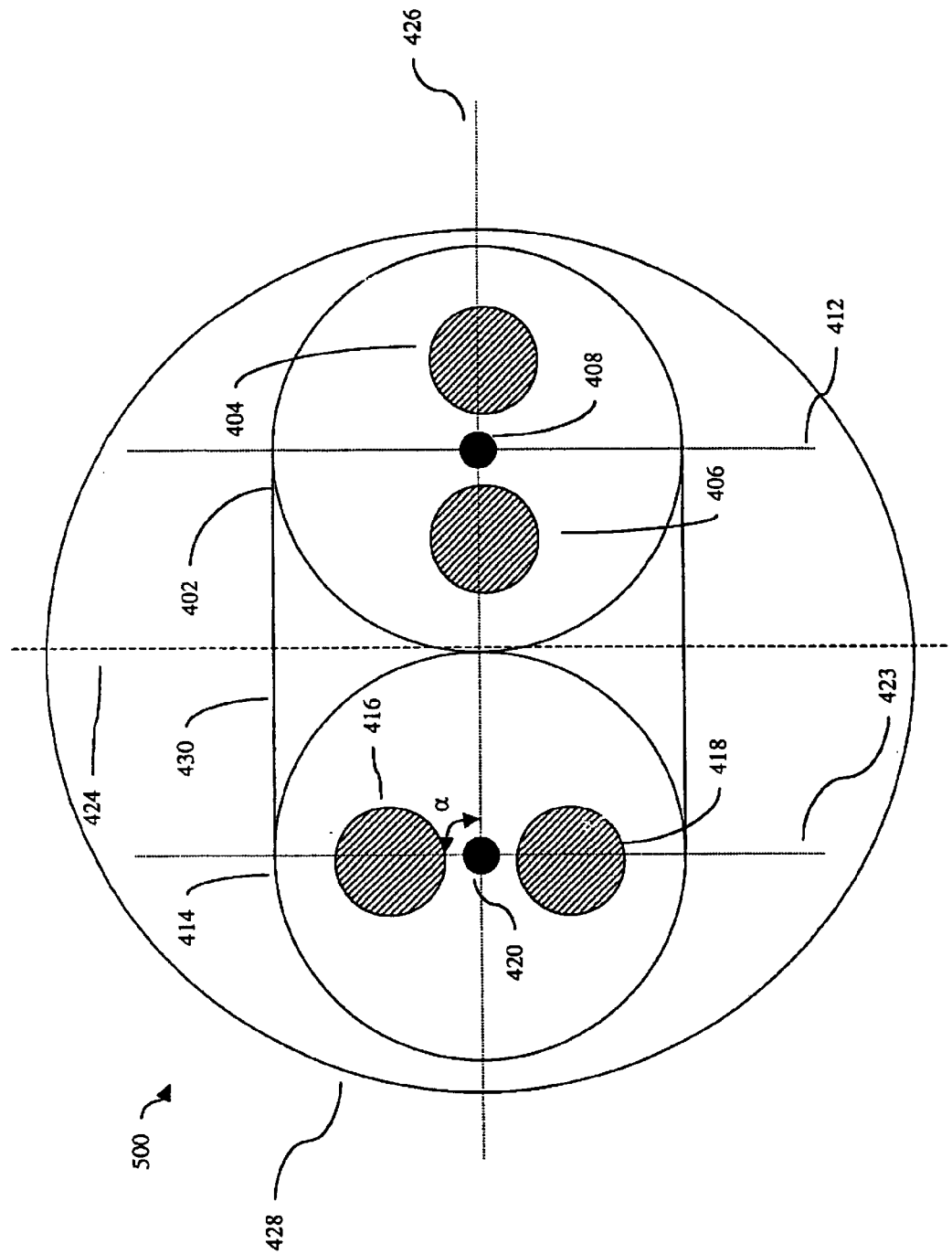
FIG. 5 is a cross-sectional diagram of the present invention.

FIG. 5 is a cross-sectional diagram of a pigtail pair 500 configured according to the present invention. The pigtail pair 500 includes similar elements as shown and described in FIG. 4 and similar matter is designated with similar designations in FIG. 5.

To maintain the ER of each fiber between a pigtail pair, or a group of PM fibers arranged as an apparatus, the inventors have proposed the following solution.

Unlike the pigtail pair of FIG. 4, first and second PM fibers 402 and 414 in pigtail pair 400 are disposed within ferrule 428 in a predetermined manner. In the presently preferred embodiment shown in FIG. 5, second PM fiber 414 is aligned such that its corresponding stress applying parts form an axis which is parallel with secondary slow axis 426. In a preferred embodiment, the stress applying parts of second FM fiber 414 each fall on the secondary slow axis of pigtail pair 500. Also, second PM fiber 414 is aligned such that its stress applying parts fall on an axis having an angle of approximately a 90° angle with respect to the secondary slow axis 426, as indicated by α.

Furthermore, the first and second PM fibers 402 and 414 are disposed such that their corresponding stress applying parts form axes approximately rights angles (90°) with respect to each other. Thus, a method is disclosed herein whereby a plurality of PM fibers may be disposed such that the PM fiber's corresponding principal axes intersect at approximately right angles (90°). Additionally, a method has been disclosed herein whereby a plurality of PM fibers may be disposed such that the corresponding principal and secondary axes intersect at approximately right angles.

Since the principal axes of the pigtail pair is overlapping on top of that of each PM fiber, the inventors have found that by disposing PM fibers according to the embodiment as disclosed in FIG. 5, the ER of the PM fiber in pigtail pair is maintained. Further, the polarization direction of light traveling through each PM fiber in the pigtail pair is usually not affected. In another words, it will be maintained along either the slow or the fast axes of the PM fiber.

While the embodiments disclosed herein have focused on a pigtail pair of PM fibers, it is contemplated that the methods of the present invention may also be applied to groupings of PM fibers greater in number than two.

The inventors have also found that the present invention has reduced the sensitivity of the ER of fiber pigtails regarding various manufacturing processes. For example, the inventors have found that the present invention reduces the sensitivity of ER regarding the type of epoxy used in gluing the two PM fibers in the ferrule, the conditions under which the epoxy is cured during the manufacturing process, and the temperature stresses the fiber pigtails experience during the fabrication process. When these factors are controlled, the present invention allows manufacturing to group a plurality of PM fibers without degrading the ER of each of the PM fiber.

The present invention also provides manufacturing flexibility and increases throughput. Thus, the present invention allows one to group a plurality of PM fibers without affecting the polarization direction of light traveling through each of the PM fibers.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims. For example, although in FIG. 5 the two PM fibers are shown to be in contact of each other, they may be separated by a distance in practice. Further, the slow axis of each individual fiber can intersect each other either 90° or 0° and the slow axis of each individual fiber can intersect with the secondary slow axis of the grouping either 90° or 0° In addition, the PM fiber used should not be limited to PANDA fiber only, other PM fibers such as Tiger or Bowtie PM fibers may also be used.

What is claimed is:

1. A polarization beam splitter/combiner comprising:

a body having a single mode fiber and a pigtail pair each optically coupled to said body;

said pigtail pair comprising a plurality of polarization maintaining (PM) fibers, said PM fibers each having corresponding principal axes;

said plurality of PM fibers disposed together as a grouping, said grouping having corresponding secondary axes; and whereby each said plurality of PM fibers is aligned such that said corresponding principal axes of each said plurality of said PM fibers and said secondary axes of said grouping intersect at a predetermined angle while maintaining distinct optical transmission paths in each of said fibers in said grouping.

2. The polarization splitter/combiner of claim 1, wherein said pigtail pair is disposed within a ferrule and said plurality of PM fibers are affixed with epoxy.

3. The polarization beam splitter/combiner of claim 2, wherein said alignment of said axes is maintained throughout the curing process of said epoxy.

4. The polarization beam splitter/combiner of claim 3, wherein the polarization direction of light traveling through each of said PM fibers remains unaffected throughout said curing process.

5. The apparatus of claim 4, wherein at least one of said predetermined angles is approximately 0°.

6. The apparatus of claim 4, wherein at least one of said predetermined angles is approximately 90°.

7. The apparatus of claim 4, wherein said PM fiber comprises a PANDA fiber.

8. The apparatus of claim 4, wherein said PM fiber comprises a BOWTIE fiber.

9. The apparatus of claim 4, wherein said PM fiber comprise a PM fiber using stress applying parts (SAP).

* * * * *